United States Patent [19]

Oldham

[11] 4,036,516
[45] July 19, 1977

[54] SAND DISPENSING DEVICE FOR A MOTOR VEHICLE

[76] Inventor: Frank Oldham, 113 Green Ave., Hempstead, N.Y. 11550

[21] Appl. No.: 593,877

[22] Filed: July 7, 1975

[51] Int. Cl.² .................. B60B 39/06; B61C 15/10
[52] U.S. Cl. ........................... 291/38; 291/29; 291/47
[58] Field of Search ............. 291/16, 38, 39, 46, 291/47

[56] References Cited

U.S. PATENT DOCUMENTS

| | | | |
|---|---|---|---|
| 1,469,627 | 10/1923 | Duffner | 291/38 X |
| 1,604,168 | 10/1926 | Johnson | 291/38 X |
| 1,657,960 | 1/1928 | Ficarra | 291/38 X |
| 1,786,377 | 12/1930 | Whipple | 291/38 |
| 1,877,475 | 9/1932 | Cowan | 291/39 X |
| 2,223,722 | 12/1940 | Farrell | 291/38 |

Primary Examiner—Stephen G. Kunin

[57] ABSTRACT

A sand dispensing device includes a sand storage unit having a pair of holes in each end; wherein the sand storage unit is contained within the trunk of the motor vehicle. A pair of chute and dispensing unit assemblies extend downwardly through the floor board of the automobile, wherein the top of each chute communicates with the ends of the sand storage unit and the dispensing unit is positioned in front of each rear wheel. A cable mechanism is provided for opening and closing a movable rear end wall of each dispensing unit.

2 Claims, 4 Drawing Figures

SAND DISPENSING DEVICE FOR A MOTOR VEHICLE

SUMMARY OF THE INVENTION

My invention relates to a unique and novel sanding dispensing unit for the application of a layer of non-skid material such as sand adjacent to each rear wheel of a motor vehicle, whereby an improved traction is realized between the rear wheels and a slippery surface such as ice or snow.

A number of U.S. Pat. Nos. 1,842,506; 2,207,169; 2,211,256; and 2,239,518 have employed sand dispensing devices, wherein the sand is dispensed by air means, and not by gravitional force as does my present invention.

An object of my present invention is to provide a sanding device for application of sand adjacent to the rear wheels of the motor vehicle, wherein the sand flows freely by gravitional force and is not dependent upon complicated air blowing means.

A still further object of my present invention is to provide a means of controlling the delivery of the sand to each rear wheel from the interior of the automobile.

A still further object of my present invention is to provide a sand dispensing device of simple design and relatively low manufacturing cost.

Briefly, my present invention comprises a sand storage unit having a pair of holes in each end; wherein the sand storage unit is contained within the trunk of the motor vehicle. A pair of chute and dispensing unit assemblies extend downwardly through the floor board of the automobile, wherein the top of each chute communicates with the ends of the sand storage unit and the dispensing unit is positioned behind each rear wheel. A cable mechanism is provided for opening and closing a movable rear end wall of each dispensing unit.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
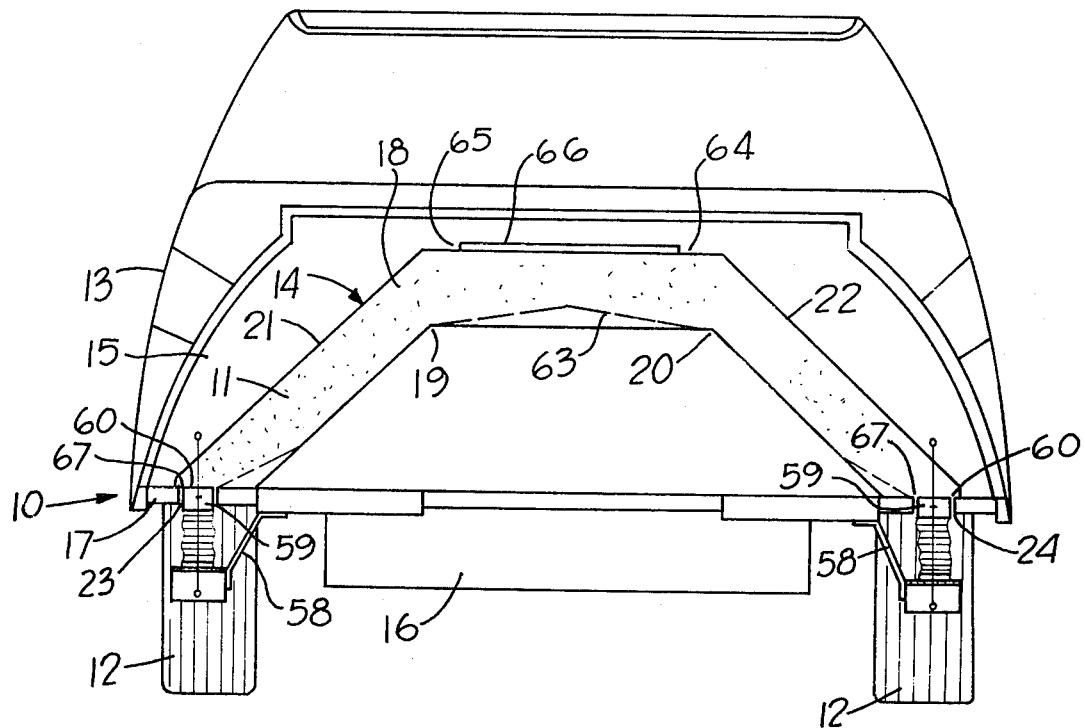
FIG. 1 illustrates a cross sectional view of a sanding device for the rear wheels of a motor vehicle in a plane forward of the rear wheels.

Turning now descriptively to the drawings, in which similar reference characters denote similar elements throughout the several views, FIG. 1 shows a sanding device 10 used to apply a uniform deposit of sand 11 in front of the rear wheels 12 of a motor vehicle 13, wherein the sand permits the rear wheels 12 to obtain improved traction upon a slippery surface such as ice or snow. The device 10 broadly consists of a sand storage unit 14 contained in a rear trunk 15 of a motor vehicle 13 over the gasoline tank 16 mounted to the underside of the floor board 17 of the motor vehicle 13. The storage unit 14 is formed from an open ended hollow rectangular shaped portion 18. The lower base 63 of portion 18 is slightly indented upward at its center so that the lower base 63 slants downward slightly towards its open ends 19, 20. The top base 64 of portion 18 has a threaded aperture 65 therethrough, wherein a screw cap element 66 threadably engages aperture 65. The sand 11 is injected into the storage unit 14 through aperture 65. To each open end 19, 20 of portion 18 is affixed at an obtuse downward extending angle, a hollow rectangular shaped member 21, 22 each having a closed bottom end 67. The combination of portion 18 and members 21, 22 form the storage unit 14 for the sand 11. Each closed bottom end 67 has a hole 60 therethrough, wherein a downward extending cylindrical sleeve member 59 communicates with hole 60 and is sealed to end 67. The floor board 17 has two apertures 23, 24 therethrough, wherein each aperture 23, 24 is aligned in front of a rear wheel 12 of the motor vehicle 13. Each sleeve member 59 fits downward into each aperture 23, 24.

Figure 2:
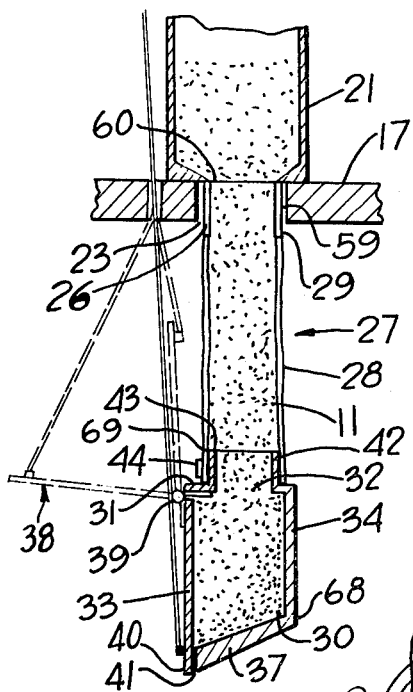
FIG. 2 illustrates a side cross sectional view of a chute and dispensing assembly of the sanding device.
Figure 3:
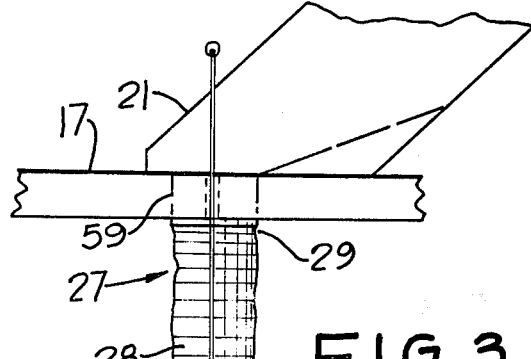
FIG. 3 illustrates a rear view of the chute and dispensing assembly of the sanding device.

FIGS. 2–3 show one of the identical chute and dispensing unit assemblies 27 of the sanding device 10. An upper 29 of each flexible cylindrical shaped chute 28 of a corrugated outer surface 26 fits upward onto each sleeve member 59 within each aperture 23, 24, wherein the end 29 of chute 28 is sealed onto sleeve 59 by adhesive or clamping means. Each dispenser housing 30 consist of a top base 31 having an opening 32 therethrough, a downward extending front end wall 34, a movable downward extending rear end wall 33, a pair of downward extending sidewalls 35, 36, and a closed bottom base 37. The movable rear end wall 33 is of a greater longitudinal depth than the fixed front end wall 34, and the bottom edges 25 of the side walls 35, 36 are slanted downward rearwardly from the front 34 to the rear 33 end wall. The bottom base 37 is affixed to the bottom edge 68 of the front end wall 34 and bottom dges 25 of the sidewall walls 35, 36 such that the bottom base 37 slants rearwardly downward from the front 34 to the rear 33 end walls. The rear end wall 33 is hingably mounted to the top base 32 of housing 30 by a hinge assembly 39, wherein the rear end wall 33 can be vertically rotated upwardly as shown by phantomlines 38. The bottom edge 40 of the rear end wall 33 in a closed position engages the rearward edge 41 of bottom base 37, sealing the housing 30 closed. An upward extending cylindrical sleeve element 42 is affixed to the top base 31 of each housing 30 on the periphery of each opening 32. The upper end 43 of each element 42 inserts upward into the lower end 69 of each chute 28, wherein a clamp 44 around the chute 28 anchors element 42 within the chute 28. A first end 53 of a cable member 45 is secured onto the bottom outside face of the movable rear end wall 33, wherein the cable member 45 extends upward into the interior of the motor vehicle 13.

Figure 4:
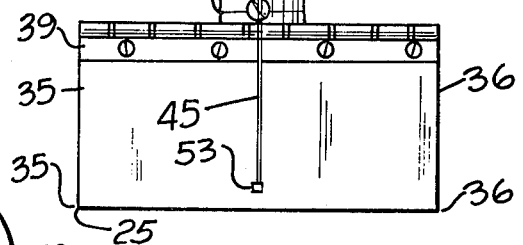
FIG. 4 illustrates a rear view of the control assembly for the sanding device.
Figure 4:
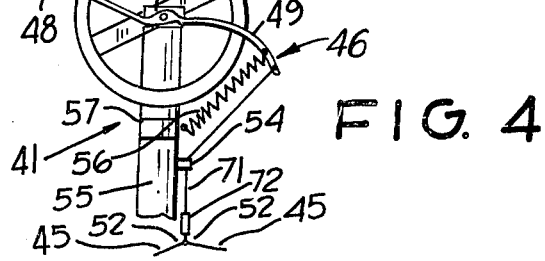

FIG. 4 shows the control assembly 46 of the sanding device 10. A lever arm 47 having a handle end 48 and a cable mounting end 49 is rotatably mounted at its center point onto the center hub 50 of a steering wheel 51. The second ends 52 of the cable members 45 are joined toward into a common cable element 71 having a length adjusting element 72. The cable element 71 passes upward through a guide bracket 54 mounted onto the steering column 55, wherein the cable element 71 is joined to the cable end 49 of the lever arm 47. A tension spring 56 communicates between the cable end 49 of the lever arm 47 and a C-clamp 57 mounted onto steering column 55.

Referring back to FIG. 1, a bracket element 58 is affixed between one side wall 35 of the housing 30 and the underside of the floor board 17.

In use, the lever arm 47 is rotated causing the cable members 45 to lift upward the rear end walls 33 of each dispenser housing 30. The sand flows downward from the storage unit 14 through each chute 28, outward through each dispensing unit 30 and deposits onto the ground in front of each rear wheel 12.

Hence, obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A sanding device for a motor vehicle having a pair of rear wheels, a floor board, an interior compartment, and a trunk, which comprises:
    a. a sand storage unit having a pair of open ends and a top base with a threaded aperture therein;
    b. hollow rectangularly shaped members having open ends affixed at one of said ends to each of said open ends of said storage unit;
    c. cylindrical sleeve members affixed linearly to one of said other open ends of each of said rectangularly shaped members, each said sleeve member adapted to be received through said floor board;
    d. chute assemblies affixed linearly onto each of said sleeve members, each of said chutes disposed below said floor board;
    e. dispensing unit assemblies affixed linearly onto each of said chute assemblies;
    f. means for opening and closing each said dispensing unit, wherein each said dispensing unit has a closed bottom base and a movable end wall, said movable end wall of each said dispensing unit affixed to one end of one of a plurality of cables, said movable end wall of each said dispensing unit being rotated upwardly by application of tension to each said cable;
    g. a common cable element, one end of said common cable element joined to said other end of each said cable within an interior of said motor vehicle;
    h. a lever arm having a handle end and a cable mounting end rotatably adapted to be mounted at its center onto a central hub of a steering wheel, said cable mounting end of said lever arm joined to another end of said common cable element; and
    i. a tension spring joined between said cable mounting end of said lever arm and a C-clamp mounted on a steering column.

2. A sanding device as recited in claim 1, wherein said cable assembly comprises a lever arm adapted to be received in said interior compartment, said other end of said cable affixed to said lever arm.

* * * * *